United States Patent
Kohira et al.

(10) Patent No.: US 9,876,206 B2
(45) Date of Patent: Jan. 23, 2018

(54) CYLINDRICAL SEALED BATTERY

(71) Applicant: Sanyo Electric Co., Ltd., Daito-shi, Osaka (JP)

(72) Inventors: Kazutoshi Kohira, Osaka (JP); Kyosuke Miyata, Osaka (JP)

(73) Assignee: SANYO Electric Co., Ltd., Daito-shi (JP)

( * ) Notice: Subject to any disclaimer, the term of this patent is extended or adjusted under 35 U.S.C. 154(b) by 0 days.

(21) Appl. No.: 15/126,905

(22) PCT Filed: Mar. 18, 2015

(86) PCT No.: PCT/JP2015/001506
§ 371 (c)(1),
(2) Date: Sep. 16, 2016

(87) PCT Pub. No.: WO2015/146077
PCT Pub. Date: Oct. 1, 2015

(65) Prior Publication Data
US 2017/0110699 A1 Apr. 20, 2017

(30) Foreign Application Priority Data
Mar. 28, 2014 (JP) .............................. 2014-067843

(51) Int. Cl.
*H01M 2/12* (2006.01)
*H01M 4/525* (2010.01)
(Continued)

(52) U.S. Cl.
CPC ......... *H01M 2/1241* (2013.01); *H01M 2/022* (2013.01); *H01M 2/0413* (2013.01);
(Continued)

(58) Field of Classification Search
CPC ... H01M 2/1241; H01M 2/022; H01M 2/0413
See application file for complete search history.

(56) References Cited

U.S. PATENT DOCUMENTS

2009/0148767 A1   6/2009   Yamashita et al.

FOREIGN PATENT DOCUMENTS

| JP | 11-111244 A | 4/1999 |
|----|-------------|--------|
| JP | 2002-141028 A | 5/2002 |

(Continued)

OTHER PUBLICATIONS

International Search Report dated Jun. 9, 2015, issued in counterpart International Application No. PCT/JP2015/001506 (2 pages).

*Primary Examiner* — Olatunji Godo
(74) *Attorney, Agent, or Firm* — Westerman, Hattori, Daniels & Adrian, LLP

(57) ABSTRACT

A nonaqueous electrolyte secondary battery representing an embodiment of a sealed battery of the present invention includes a bottomed cylindrical exterior case (15), a sealing member (20), a cylindrical wound electrode assembly (14) including a positive electrode plate (11) and a negative electrode plate (12) wound together via a separator (13), and an electrolyte. The cylindrical wound electrode assembly (14) and the electrolyte are accommodated in the exterior case (15). An open end of the exterior case (15) is crimped together with the sealing member (20) via an insulating gasket (21) so as to form a seal. The sealing member (20) includes a valving element (23) having a thin and fragile portion (22) and a support element (25) having an opening (24). The support element (25) is disposed on an outer side of the valving element (23), and a portion of the valving element (23) is exposed to an outside environment along the inner periphery of the opening (24) in the support element (25).

6 Claims, 1 Drawing Sheet

(51) Int. Cl.
*H01M 10/0587* (2010.01)
*H01M 2/02* (2006.01)
*H01M 2/04* (2006.01)

(52) U.S. Cl.
CPC ......... *H01M 2/0486* (2013.01); *H01M 4/525* (2013.01); *H01M 10/0587* (2013.01); *H01M 2200/20* (2013.01)

(56) References Cited

FOREIGN PATENT DOCUMENTS

| | | |
|---|---|---|
| JP | 2005-019096 A | 1/2005 |
| JP | 2009-140870 A | 6/2009 |
| JP | 2011-204623 A | 10/2011 |
| WO | 2014/119308 A1 | 8/2014 |

CYLINDRICAL SEALED BATTERY

TECHNICAL FIELD

The present invention relates to cylindrical sealed batteries having a safety valve in the seal through which a gas can be effectively discharged in the event of pressure increase in the battery.

BACKGROUND ART

Nonaqueous electrolyte secondary batteries represented by lithium ion secondary batteries have a high energy density and a high capacity and are widely used as driving power sources of portable information terminals such as cellphones and notebook computers. Recently, nonaqueous electrolyte secondary batteries are increasingly demanded to be used in high-voltage and high-capacity applications such as driving power sources of battery-driven automobiles and household electricity storage systems. This trend has led to a need of such characteristics as high-output characteristics, long-term durability and safety.

Because of the use of combustible organic solvents, nonaqueous electrolyte secondary batteries are usually manufactured as sealed batteries. Sealed batteries have a risk, of rupture by the rapid generation of gas in the event of abnormalities such as internal short circuits, external short circuits, abnormal heating and abnormal impacts. As disclosed in, for example, Patent Literature 1, a known approach to solving this problem is to provide a safety valve in the seal of a cylindrical sealed battery and thereby to discharge a gas in the battery to the outside of the battery when the pressure inside the battery has reached a prescribed value.

CITATION LIST

Patent Literature

PTL 1: Japanese Published Unexamined Patent Application No. 2009-140870

SUMMARY OF INVENTION

Technical Problem

With the recent increase in the energy density of batteries, there is a risk that the battery temperature and the battery inner pressure will be increased more sharply in the event of an abnormality in the battery. As described in Patent Literature 1, a conventional cylindrical sealed battery includes a perforated cap that is disposed above the outer side of a safety valve to serve as a region for an electrical connection with other battery or a load. A gas generated inside the battery in the event of an abnormality in the battery opens the safety valve and is discharged to the outside through the opening in the cap.

Although the area of the opening in the cap is preferably as large as possible, extending the area of the opening encounters a limitation caused by the need of a region for establishing an electrical connection with other battery or a load. Consequently, cylindrical sealed batteries sometimes fail to discharge the gas sufficiently in spite of having the safety valve in the seal.

Prismatic sealed batteries do not have such a problem because the safety valve is usually exposed to the outside. Thus, there has been a demand that a gas generated inside a cylindrical sealed battery in the event of an abnormality in the battery be discharged to the outside more sufficiently than heretofore possible.

Solution to Problem

An aspect of the present invention resides in a cylindrical sealed battery including:
a bottomed cylindrical exterior case, a sealing member, a cylindrical wound electrode assembly including a positive electrode plate and a negative electrode plate wound together via a separator, and an electrolyte,
the cylindrical wound electrode assembly and the electrolyte being accommodated in the exterior case, an open end of the exterior case being crimped together with the sealing member via an insulating gasket so as to form a seal,
the sealing member including:
a valving element having a thin and fragile portion and a circular support element having an opening,
the support element being disposed on an outer side of the valving element so as to expose a portion of the valving element to an outside environment through the opening in the support element.

Advantageous Effects of Invention

In the cylindrical sealed battery according to one aspect of the invention, a portion of the valving element constituting the safety valve is exposed to the outside environment through the opening in the support element. Consequently, a gas generated in the battery in the event of an abnormality in the battery is released to the outside directly through the valving element. Thus, the gas can be discharged speedily before the battery undergoes a thermal runaway as compared to a conventional cylindrical sealed battery configured to discharge a gas through an opening disposed as a gas release hole in a cap.

When, in addition, the battery is combusted by, for example, external heating or the like and the melts of the battery constituents such as aluminum are discharged together with the gas through the valving element, the battery allows the melts such as aluminum to be immediately released to the outside. Thus, the cylindrical sealed battery according to one aspect of the invention attains higher safety than conventional batteries.

DESCRIPTION OF EMBODIMENTS

Figure 1A:
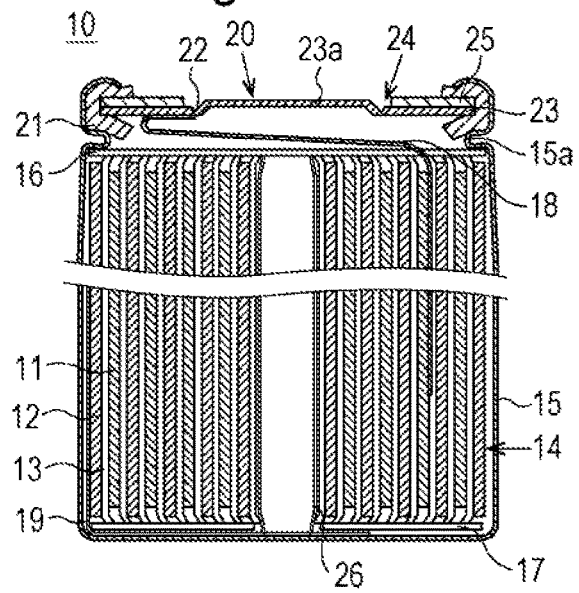
FIG. 1A is a sectional view and FIG. 1B is a schematic top plan view of a cylindrical nonaqueous electrolyte secondary battery representing Embodiment.

Hereinbelow, embodiments of the invention will be described in detail with respect to cylindrical sealed batteries applied to nonaqueous electrolyte secondary batteries as an example. The embodiments presented below are only illustrative for better understanding of the technical ideas of the invention, and do not intend to limit the scope of the invention to such embodiments. The present invention is applicable equally to various modifications that are made without departing from the technical ideas described in the claims.

(Embodiment)

A nonaqueous electrolyte secondary battery 10 as a cylindrical sealed battery of Embodiment will be described with reference to FIG. 1. The nonaqueous electrolyte secondary battery 10 includes a cylindrical wound electrode assembly 14 in which a positive electrode plate 11 and a negative electrode plate 12 are spirally wound via a separator 13. An upper insulating plate 16 and a lower insulating plate 17 are respectively disposed on and blow the cylindrical wound electrode assembly 14, and the cylindrical wound electrode assembly 14 is disposed in an exterior case 15 made of a metal.

A nonaqueous electrolytic solution (not shown) has been poured into the exterior case 15. The open end of the exterior case 15 is crimped together with a sealing member 20 via an insulating gasket 21 so as to form a seal. A positive electrode current collector 18 connected to the positive electrode plate 11 is welded to the lower surface of the sealing member 20, and a negative electrode current collector 19 connected to the negative electrode plate 12 is welded to the inner bottom of the exterior case 15. Thus, the exterior case 15 serves as a negative electrode external terminal and the sealing member 20 as a positive electrode external terminal.

The sidewall of the exterior case 15 has a grooved portion 15a protruding toward the central axis of the battery. An edge portion of the upper insulating plate 16 is held by the grooved portion 15a disposed on the sidewall of the exterior case 15 so that the plate serves as an upper stopper for the cylindrical wound electrode assembly 14. The insulating gasket 21 is disposed above the level of the grooved portion 15a and fixes the sealing member 20.

The sealing member 20 includes a valving element 23 which has a fragile portion 22 with a smaller thickness than other regions, and a circular support element 25 which is disposed on the outer side of the valving element 23 and has an opening 24. The fragile portion 22 of the valving element 23 is disposed within the inner periphery of the opening 24 in the support element 25. The support element 25 is disposed to impart a strength withstanding the fitting of the sealing member 20 into the open end of the exterior case 15. With this configuration, the valving element 23 can be easily broken at the fragile portion 22 to form a hole so that a gas generated inside the battery in the event of an abnormality in the battery can be easily discharged to the outside, thus achieving enhanced safety.

A portion of the valving element 23 is exposed to the outside environment through the opening 24 in the support element 25. This portion of the valving element 23 that is exposed to the outside defines a step 23a protruding toward the outside of the battery.

As a result of the step 23a in the valving element 23 being formed so as to protrude toward the outside of the battery, a gas generated inside the battery in the event of an abnormality in the battery is speedily accumulated to the step 23a in the valving element 23 and, when the pressure inside the exterior case 15 exceeds a prescribed value, the fragile portion 22 of the valving element 23 is broken to form a large hole in the valving element 23. Thus, the battery can sufficiently manage gas evacuation even if a gas is generated rapidly inside the battery. Consequently, the battery can eliminate a risk that the sidewall of the exterior case 15 will be damaged by the inner pressure after the hole has been formed, thereby suppressing the occurrence of cracks in the sidewall of the exterior case 15. With this configuration, the gas and the electrolytic solution that are being discharged from the inside of the exterior case 15 in the event of an abnormality in the battery can be guided exclusively toward the sealing member 20.

With the configuration described above, the nonaqueous electrolyte secondary battery 10 as a cylindrical sealed battery of Embodiment prevents adverse effects on components adjacent to the sidewall of the exterior case 15. When, for example, the nonaqueous electrolyte secondary batteries 10 as cylindrical sealed batteries are used in an assembled battery, the occurrence of an abnormality in a single battery does not impair the safety of the other batteries constituting the assembled battery.

The portion of the valving element 23 that is exposed to the outside may serve as a lead welding portion for establishing a connection to an external device. Because this exposed portion is formed to protrude toward the outside of the battery, the strength of the valving element 23 can be increased and the welding of a lead is facilitated. The lead may be a lead plate or a lead wire including aluminum or an aluminum alloy. In particular, a lead wire is preferably used.

The positive electrode current collector 18 connected to the positive electrode plate 11 is welded to the inner surface of the valving element 23 at a position that is closer to the outer peripheral side than the fragile portion 22 of the valving element 23 and is opposed to the support element 25. With this configuration, the positive electrode current collector 18 does not affect the operation of the valving element 23.

The fragile portion 22 of the valving element 23 is disposed closer to the inner peripheral side than the projection formed by the constriction 15a. The reason for adopting this configuration is because otherwise the fragile portion 22 is subjected to a load and may be cracked when the exterior case 15 is crimped together with the sealing member 20 including the valving element 23 and the support element 25.

Preferably, a center pin 26 is inserted to the center of the cylindrical wound electrode assembly 14. This center pin 26 provides a gas flow channel in the center of the cylindrical wound electrode assembly 14, and can guide a gas toward the sealing member 20 speedily even if the cylindrical wound electrode assembly 14 has been swollen by the gas generated inside the battery due to any abnormality in the battery.

According to the nonaqueous electrolyte secondary battery 10 of Embodiment having the configuration described above, a gas generated inside the battery due to any abnormality in the battery is released to the outside directly through the valving element 23, and consequently the gas can be discharged more quickly.

Further, the valving element 23 can form a sufficiently large hole. Thus, in the event that the nonaqueous electrolyte secondary battery 10 of Embodiment is combusted by external heating or the like and the melts of the battery constituents such as aluminum are discharged together with the gas through the valving element 23, the melts such as aluminum can be immediately released to the outside while the valving element 23 is prevented from being clogged by the melts such as aluminum. As a result, the nonaqueous electrolyte secondary battery 10 of Embodiment attains enhanced safety as compared to conventional cylindrical sealed batteries.

In the above configuration, the valving element 23 may include aluminum or an aluminum alloy. Aluminum or an aluminum alloy is lightweight, easy to deform and highly resistant to electrolytic solutions, and is therefore suited as the material of the valving element 23. The thin and fragile portion 22 of the valving element 23 may be formed by any methods without limitation. Press working is preferable because of its simplicity.

In nonaqueous electrolyte secondary batteries, a current collector connected to a positive electrode plate usually includes aluminum or an aluminum alloy in view of the fact that the core of the positive electrode plate is aluminum or an aluminum alloy. In the nonaqueous electrolyte secondary battery 10 of Embodiment, easy welding may be attained by adopting a valving element 23 that includes aluminum or an aluminum alloy similarly to the positive electrode current collector 18 of aluminum or an aluminum alloy.

The support element 25 is preferably composed of a plate member including stainless steel or a nickel-plated steel sheet. Stainless steel or a nickel-plated steel sheet, has a higher strength than aluminum or an aluminum alloy forming the valving element 23. Because the sealing member 20 is formed of two plate elements, namely, the valving element 23 including aluminum or an aluminum alloy and the support element 25 including stainless steel or a nickel-plated steel sheet, the strength of the sealing member 20 itself can be ensured while ensuring that the fragile portion 22 of the valving element 23 will be easily broken upon increase in the inner pressure in the battery.

Figure 1B:
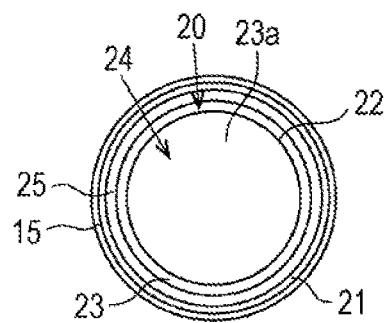

Next, a method for manufacturing the nonaqueous electrolyte secondary battery 10 of Embodiment illustrated in FIG. 1 will be specifically described with appropriate reference to FIG. 1.

[Fabrication of Positive Electrode Plate]

A positive electrode active material including lithium.nickel.cobalt.aluminum composite oxide ($LiNi_{0.8}Co_{0.15}Al_{0.05}O_2$), a conductive agent including acetylene black, and a binder including polyvinylidene fluoride (PVdF) were weighed in a mass ratio of 100:2.5:1.7 and were mixed together with an organic solvent including N-methyl-2-pyrrolidone to give a positive electrode mixture paste. The positive electrode mixture paste was applied to both sides of an aluminum foil (thickness: 15 μm) as a positive electrode core in a uniform thickness by a doctor blade method.

The coated foil was passed through a dryer to remove the organic solvent, was rolled with a roll press machine, and was thereafter cut. A positive electrode plate was thus fabricated which had the positive electrode mixture layer on both sides of the positive electrode core. Subsequently, a positive electrode current collector 18 made of aluminum was ultrasonically welded to a portion of the positive electrode core exposed from the positive electrode mixture layer. In this manner, a positive electrode plate 11 with a length of 573 mm, a width of 57 mm and a thickness of 163 μm was fabricated.

[Fabrication of Negative Electrode Plate]

A negative electrode active material including graphitizable carbon particles, a binder including polyvinylidene fluoride (PVdF), and a thickener including carboxymethyl cellulose were mixed together in a mass ratio of 100:0.6:1. The mixture was mixed with an appropriate amount of water to give a negative electrode mixture paste. The negative electrode mixture paste was applied to both sides of a copper foil (thickness: 10 μm) as a negative electrode core in a uniform thickness by a doctor blade method.

The coated foil was passed through a dryer to remove the water, was rolled with a roll press machine, and was thereafter cut. A negative electrode plate was thus fabricated which had the negative electrode mixture layer on both sides of the negative electrode core. Subsequently, a negative electrode current collector 19 made of nickel was ultrasonically welded to a portion of the negative electrode core exposed from the negative electrode mixture layer. In this manner, a negative electrode plate 12 was fabricated.

[Fabrication of Cylindrical Wound Electrode Assembly]

The positive electrode plate 11 and the negative electrode plate 12 fabricated as described above were wound with a winding machine while being insulated from each other via a separator 13 composed of a polyethylene microporous film. An insulating tape was attached to the end of the coil. In this manner, a cylindrical wound electrode assembly 14 was fabricated.

[Preparation of Nonaqueous Electrolyte]

Ethylene carbonate (EC), dimethyl carbonate (DMC) and ethyl methyl carbonate (EMC) were mixed together in a volume ratio of 2:2:6 (at 1 atm and 25° C.). To this nonaqueous solvent, $LiPF_6$ as an electrolyte salt was dissolved with a concentration of 1.0 M (mol/L). A nonaqueous electrolytic solution was thus prepared.

[Fabrication of Sealing Member]

A 0.4 mm thick aluminum alloy was pressed to form a valving element 23 having a diameter of 17 mm which had a fragile portion 22 on the surface that would face the outside of the battery, and a step 23a protruding toward the outside of the battery within the inner periphery of the fragile portion 22. A 0.3 mm thick stainless steel sheet was pressed to form a circular support element 25 having an outer diameter of 17 mm and an inner diameter of 9 mm. The valving element 23 and the support element 25 were stacked together, and the respective 3 mm inner portions from the outer periphery were joined to each other by laser welding. A sealing member 20 was thus fabricated.

[Fabrication of Exterior Case]

A steel sheet as a base was plated with nickel and was thereafter drawn to form a bottomed cylindrical exterior case 15. Here, the exterior case 15 had a thickness of 0.2 mm at the open end to be sealed and a thickness of 0.25 mm at the side wall. The bottom of the exterior case 15 had a thickness of 0.3 mm and was provided with a C-shaped groove. The thickness of the groove was 0.05 mm.

[Assembling of Battery]

An upper insulating plate 16 and a lower insulating plate 17 both made of polypropylene were respectively placed on and below the cylindrical wound electrode assembly 14 fabricated as described hereinabove. The cylindrical wound electrode assembly 14 was then accommodated into the exterior case 15, and the negative electrode current collector 19 and the bottom of the exterior case 15 were resistance welded. Thereafter, the exterior case 15 was plastically deformed to form a circumferential grooved portion 15a having a width of 1.0 mm and a depth of 1.5 mm. The nonaqueous electrolytic solution prepared as described hereinabove was poured into the exterior case 15.

Thereafter, the valving element 23 of the sealing member 20 and the positive electrode current collector 18 were laser welded to each other. Subsequently, the open end of the exterior case 15 was crimped together with the sealing member 20 fitted with an insulating gasket 21 to form a seal. In this manner, a nonaqueous electrolyte secondary battery 10 as a cylindrical sealed battery of Embodiment having a height of 65 mmm and a diaraeter of 18 mm was fabricated. The volume energy density of the nonaqueous electrolyte secondary battery 10 was 500 Wh/L.

COMPARATIVE EXAMPLE

Figure 2:
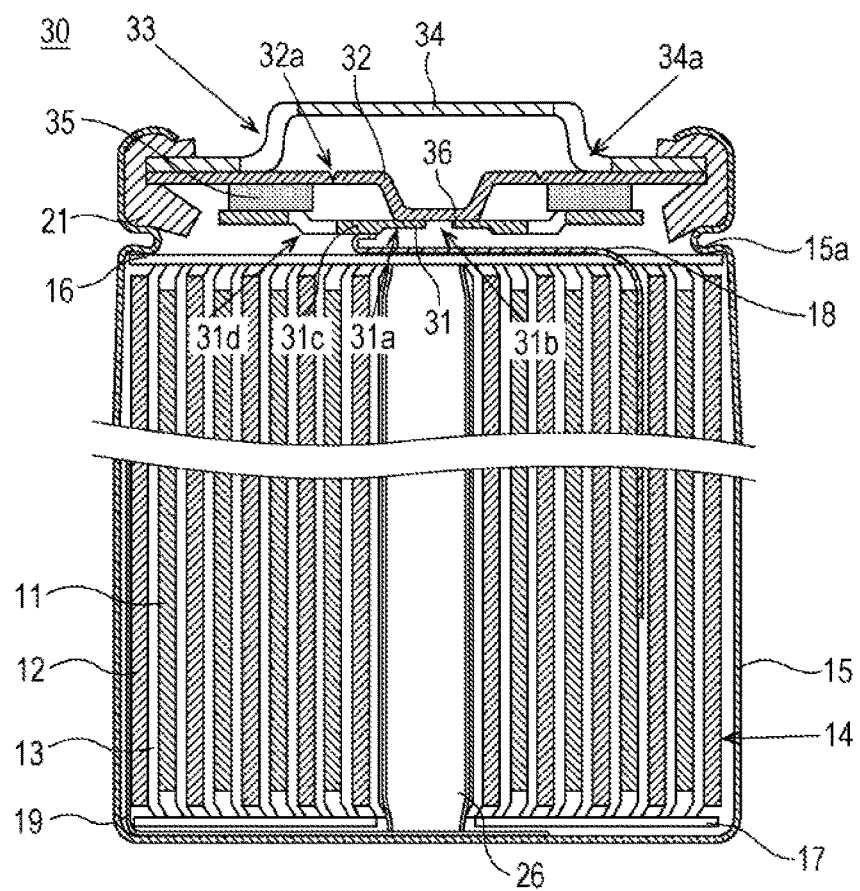
FIG. 2 is a sectional view of a cylindrical nonaqueous electrolyte secondary battery representing Comparative Example.

FIG. 2 illustrates a nonaqueous electrolyte secondary battery 30 as a comparative cylindrical sealed battery representing a conventional example. The nonaqueous electrolyte secondary battery 30 has the same configuration as the nonaqueous electrolyte secondary battery 10 of Embodiment except that a sealing member 33 has a conventional structure including a terminal plate 31, an explosion-proof valve 32 and a cap 34. Thus, the nonaqueous electrolyte secondary battery 30 of Comparative Example will be described in detail with respect only to the configuration of the sealing member 33, and the members common to the nonaqueous electrolyte secondary battery 10 of Embodiment will be indicated with the same reference signs and the detailed description thereof will be omitted.

The sealing member 33 includes a cap 34 which has a gas release hole 34a, a terminal plate 31 and an explosion-proof valve 32 which have respective breakable grooves 31a and 32a to be broken upon increase in the inner pressure of the battery, and an insulating plate 35. An opening 31b is disposed in a central portion of the terminal plate 31 that is closer to the inner peripheral side than the breakable groove 31a. A weld spot 36 is formed at the boundary between the opening 31b and the explosion-proof valve 32 as a result of laser welding. Thus, the terminal plate 31 and the explosion-proof valve 32 are electrically connected to each other. In the terminal plate 31, another opening 31d is disposed closer to the outer peripheral side than the breakable groove 31a.

The outer peripheral side of the terminal plate 31 has a larger thickness and serves as a terminal plate portion 31c that is electrically connected to a positive electrode plate 11. A positive electrode current collector 18 connected to the positive electrode plate 11 is ultrasonically welded to this terminal plate portion 31c to establish an electrical connection.

Upon increase in the inner pressure in this comparative nonaqueous electrolyte secondary battery 30, the breakable groove 31a is broken to cause a disconnection in the current pathway between the terminal plate 31 and the explosion-proof valve 32, thus the conduction from the terminal plate 31 to the cap 34 being interrupted. With a further increase in the inner pressure in the battery, the breakable groove 32a is broken to form a hole in the explosion-proof valve 32, and the gas in the battery is discharged to the outside of the battery through the hole formed in the explosion-proof valve 32 and the gas release hole 34a.

This nonaqueous electrolyte secondary battery 30 illustrated as a cylindrical sealed battery of Comparative Example had a volume energy density of 500 Wh/L.

[Safety Test]

Ten nonaqueous electrolyte secondary batteries 10 of Embodiment and ten nonaqueous electrolyte secondary batteries 30 of Comparative Example were provided. At room temperature (25° C.), the batteries were charged at a constant current of 1500 mA to a voltage of 4.2 V. Thereafter, the batteries were heated on a hot plate set at 200° C. During the heating, the batteries were visually inspected for the condition of the sealing member or the detachment of the sealing member from the exterior case, and the occurrence of cracks in the sidewall of the exterior case.

According to the results of the safety test, no cracks occurred in the sidewalls of the nonaqueous electrolyte secondary batteries 10 of Embodiment in which the sealing member 20 was composed of the aluminum valving element 23 and the stainless steel support element 25 and the valving element 23 had the fragile portion 22. In contrast, the nonaqueous electrolyte secondary batteries 30 of Comparative Example using the conventional sealing member 33 suffered nine cracks in the sidewalls. It has been thus shown that the nonaqueous electrolyte secondary batteries 10 as cylindrical sealed batteries of Embodiment achieve a marked suppression of cracks in the sidewall as compared to the nonaqueous electrolyte secondary batteries 30 of Comparative Example.

As demonstrated above, the nonaqueous electrolyte secondary battery 10 as a cylindrical sealed battery of Embodiment is configured so that the fragile portion 22 of the valving element 23 is broken promptly to form a hole upon increase in the inner pressure in the battery and, because there is no obstacles shielding the outside of the step 23a, quick formation of such a large hole in the battery is feasible. By virtue of this configuration, the nonaqueous electrolyte secondary battery 10 as a cylindrical sealed battery of Embodiment has been confirmed to be capable of sufficiently managing gas evacuation even if a gas is generated rapidly inside the battery, and has been therefore confirmed to eliminate a risk that the sidewall of the exterior case 15 will be damaged after the hole has been formed in the valving element 23.

In contrast, the nonaqueous electrolyte secondary battery 30 as a comparative cylindrical sealed battery is configured so that upon increase in the inner pressure in the battery, the breakable groove 31a is broken to cause a disconnection in the current pathway between the terminal plate 31 and the explosion-proof valve 32, and thereafter the breakable groove 32a is broken to provide a gas evacuation route. This gas evacuation route is smaller than that formed in the nonaqueous electrolyte secondary battery 10 of Embodiment and is not formed unless the pressure is elevated to a higher level.

Thus, the nonaqueous electrolyte secondary batteries 30 of Comparative Example may fail to allow a gas to be discharged sufficiently through the gas release hole disposed in the cap 34 when the gas evacuation takes place at a high pressure and thus have a higher risk that the sidewall of the exterior case 15 will be damaged as compared to the nonaqueous electrolyte secondary batteries of Embodiment. Consequently, the nonaqueous electrolyte secondary batteries 30 of Comparative Example are incapable of sufficiently preventing the occurrence of cracks in the sidewall of the exterior case 15. A crack in the sidewall of the exterior case 15 causes the gas or the electrolytic solution to leak through the crack, thus giving rise to a risk that components such as members and batteries present near the abnormal battery will be adversely affected. Incidentally, the breakage of the breakable grooves 31a and 32a occurred in all of the nonaqueous electrolyte secondary batteries 30 of Comparative Example.

The test results discussed above have shown that the nonaqueous electrolyte secondary batteries of Embodiment of the present invention can provide cylindrical sealed batteries which include a sealing member fitted with a gas evacuation valve that attains enhanced safety.

While Embodiment has illustrated the cylindrical sealed batteries as being applied to nonaqueous electrolyte secondary batteries, the scope of the invention is not limited thereto. The invention may be also applied to alkaline storage batteries such as nickel-hydrogen storage batteries and nickel-cadmium storage batteries.

When, in particular, the invention is applied to nonaqueous electrolyte secondary batteries, the materials of the battery constituents may be any known materials as described below. Specific examples will be described below.

The positive electrode plate used in the invention may be fabricated by forming a positive electrode active material layer onto a positive electrode core in the form of a foil (a thin plate). The material of the positive electrode core may be, among others, any of aluminum, aluminum alloys, stainless steel, titanium and titanium alloys. In particular, aluminum or an aluminum alloy is preferable for reasons such as that the material is resistant to electrochemical dissolution.

The positive electrode active material may be a lithium transition metal composite oxide, for example, a composite oxide including lithium and at least one metal selected from cobalt, manganese, nickel, chromium, iron and vanadium. In particular, the use of a lithium transition metal composite oxide represented by the general formula $Li_xNi_yM_{1-y}O_2$ ($0.95 \leq x \leq 1.10$, and M is at least one of Co, Mn, Cr, Fe, Mg, Ti and Al) is preferable because the obtainable nonaqueous electrolyte secondary batteries attain a high capacity and excellent safety.

The negative electrode plate used in the invention may be fabricated by forming a negative electrode active material layer onto a negative electrode core. The material of the negative electrode core may be, among others, any of copper, copper alloys, nickel, nickel alloys, stainless steel, aluminum and aluminum alloys. In particular, copper, a copper alloy, nickel or a nickel alloy is preferable for reasons such as that the material is resistant to electrochemical dissolution.

The negative electrode active material may be any material capable of reversible storage and release of lithium ions, with examples including carbon materials such as natural graphites, spherical or fibrous artificial graphites, non-graphitizable carbons (hard carbons) and graphitizable carbons (soft carbons), metal oxide materials such as tin oxide and silicon oxide, silicon, and silicon-containing compounds such as silicides.

The separator may be a microporous film including a polyolefin material. A combination of a polyolefin material and a heat resistant material is preferably used. Examples of the polyolefins include polyethylene, polypropylene and ethylene-propylene copolymer. These resins may be used singly, or two or more may be used in combination. Examples of the heat resistant materials include heat resistant resins such as aramid, polyimide and polyamidimide, and mixtures of heat resistant resins and inorganic fillers.

The nonaqueous electrolyte is prepared by dissolving a lithium salt into a nonaqueous solvent. Examples of the nonaqueous solvents include cyclic carbonates such as ethylene carbonate, propylene carbonate and butylene carbonate, and chain carbonates such as dimethyl carbonate, diethyl carbonate and ethyl methyl carbonate. A single type, or several types of such solvents may be used.

The supporting salt that is added to the nonaqueous electrolyte may be a lithium salt having high electron-withdrawing properties, with examples including $LiPF_6$, $LiBF_4$ and $LiClO_4$. A single type, or several types of such salts may be used. Known additives such as vinylene carbonate may be added to the nonaqueous electrolyte.

INDUSTRIAL APPLICABILITY

As described hereinabove, the cylindrical sealed batteries of the present invention allow a gas to be discharged therefrom effectively in the event of an abnormality in the battery while preventing the leakage of the gas or the electrolytic solution through the sidewall of the exterior case. Thus, the cylindrical sealed batteries achieve a great significance in industry.

REFERENCE SIGNS LIST

10: NONAQUEOUS ELECTROLYTE SECONDARY BATTERY 11: POSITIVE ELECTRODE PLATE 12: NEGATIVE ELECTRODE PLATE 13: SEPARATOR 14: CYLINDRICAL WOUND ELECTRODE ASSEMBLY 15: EXTERIOR CASE 15a: GROOVED PORTION 16: UPPER INSULATING PLATE 17: LOWER INSULATING PLATE 18: POSITIVE ELECTRODE CURRENT COLLECTOR 19: NEGATIVE ELECTRODE CURRENT COLLECTOR 20: SEALING MEMBER 21: INSULATING GASKET 22: FRAGILE PORTION 23: VALVING ELEMENT 23a: STEP 24: OPENING 25: SUPPORT ELEMENT 26: CENTER PIN 30: NONAQUEOUS ELECTROLYTE SECONDARY BATTERY 31: TERMINAL PLATE 31a: BREAKABLE GROOVE 31b, 31d: OPENING 31c: TERMINAL PLATE PORTION 32: EXPLOSION-PROOF VALVE 32a: BREAKABLE GROOVE 33: SEALING MEMBER 34: CAP 34a: GAS RELEASE HOLE 35: INSULATING PLATE 36: WELD SPOT

The invention claimed is:

1. A cylindrical sealed battery comprising:
a bottomed cylindrical exterior case, a sealing member, a cylindrical wound electrode assembly including a positive electrode plate and a negative electrode plate wound together via a separator, and an electrolyte,
the cylindrical wound electrode assembly and the electrolyte being accommodated in the exterior case, an open end of the exterior case being crimped together with the sealing member via an insulating gasket so as to form a seal,
the sealing member including:
a valving element having a thin and fragile portion and a circular support element having an opening, and
the support element being disposed on an outer side of the valving element so as to expose a portion of the valving element to an outside environment through the opening in the support element.

2. The cylindrical sealed battery according to claim 1, wherein the fragile portion of the valving element is disposed within the inner periphery of the opening.

3. The cylindrical sealed battery according to claim 1, wherein the portion of the valving element exposed to the outside environment protrudes toward the outside.

4. The cylindrical sealed battery according to claim 1, wherein the valving element includes aluminum or an aluminum alloy and the support element includes stainless steel or a nickel-plated steel sheet.

5. The cylindrical sealed battery according to claim 1, wherein the sidewall of the exterior case has a constriction protruding toward the axis of the battery, and the thin portion of the valving element is disposed closer to the inner peripheral side than the constriction.

6. The cylindrical sealed battery according to claim 1, wherein the positive electrode plate includes a positive electrode active material including a lithium nickel composite oxide represented by the general formula $Li_xNi_yM_{1-y}O_2$ ($0.95 \leq x \leq 1.10$, M is at least one of Co, Mn, Cr, Fe, Mg, Ti and Al, and $0.6 \leq y \leq 0.95$), and
the volume energy density is not less than 500 Wh/L.

* * * * *